United States Patent
Thrap (12)

(10) Patent No.: US 6,614,671 B2
(45) Date of Patent: Sep. 2, 2003

(54) DUAL ISOLATED POWER SUPPLY INPUTS

(75) Inventor: Guy Thrap, Del Mar, CA (US)

(73) Assignee: I-Bus / Phoenix, Incorporated, San Diego, CA (US)

( * ) Notice: Subject to any disclaimer, the term of this patent is extended or adjusted under 35 U.S.C. 154(b) by 87 days.

(21) Appl. No.: 10/007,319

(22) Filed: Nov. 9, 2001

(65) Prior Publication Data

US 2003/0090916 A1 May 15, 2003

(51) Int. Cl.[7] ............................ H02M 7/00; H02J 7/00
(52) U.S. Cl. ............................ 363/67; 363/69; 307/64
(58) Field of Search ........................... 363/65, 67, 69, 363/70; 307/44, 64, 80, 82, 86, 87

(56) References Cited

U.S. PATENT DOCUMENTS

| | | |
|---|---|---|
| 3,339,082 A | 8/1967 | Rhyne, Jr. |
| 3,515,896 A | 6/1970 | Swing et al. |
| 3,652,866 A | 3/1972 | Moakler et al. |
| 5,138,547 A | 8/1992 | Swoboda |
| 5,245,219 A | 9/1993 | Romatzick, Jr. et al. |
| 5,319,533 A | 6/1994 | Reynolds et al. |
| 5,668,417 A | 9/1997 | Wiscombe et al. |
| 5,790,394 A * | 8/1998 | Cabaniss et al. ............ 363/65 |
| 5,808,378 A | 9/1998 | O'Leary |
| 5,808,421 A | 9/1998 | Buonocunto |
| 5,886,422 A | 3/1999 | Mills |
| 5,892,299 A | 4/1999 | Siewert et al. |
| 5,920,129 A | 7/1999 | Smith |
| 5,995,396 A | 11/1999 | Byrne et al. |
| 6,081,437 A * | 6/2000 | Chen et al. ............... 363/70 |
| 6,137,706 A | 10/2000 | Nesbitt et al. |

* cited by examiner

*Primary Examiner*—Jessica Han
(74) *Attorney, Agent, or Firm*—Fitch, Even, Tabin & Flannery

(57) ABSTRACT

A power supply system for providing power from either a first power supply or a second power supply to an ultimate rectified output. The system consists of a first switch that couples the rectified output of the first power supply to the ultimate rectified output, and a second switch that couples the rectified output of the second power supply to the ultimate rectified output. When the first power supply is providing a voltage within a predetermined window and the first switch is closed, the first power supply provides an inhibit signal to the second switch of the second power supply that prevents the second power supply from providing power to the ultimate rectified output. Similarly, when the second power supply is providing a voltage within a predetermined window and the second switch is closed, the second power supply provides an inhibit signal to the first switch of the first power supply that prevents the first power supply from providing power to the ultimate rectified output. The first and second power supplies are electrically isolated and the inhibit signals are transferred without conducting electrical current between the first and the second power supplies.

19 Claims, 3 Drawing Sheets

DUAL ISOLATED POWER SUPPLY INPUTS

BACKGROUND OF THE INVENTION

1. Field of the Invention

The present invention relates generally to electric power supplies, and more specifically to redundant, automatic switching power supplies. Even more specifically, the present invention relates to mutual isolation of inputs to redundant power supplies.

2. Discussion of the Related Art

For many critical or important electrical and/or electronic equipment or systems, it is desirable to have an alternate, or "standby," power source if a primary power source is lost or becomes unreliable.

A few examples of such equipment or systems are computer systems for hospital operating rooms and critical care equipment, air traffic control systems, police and fire emergency equipment, telecommunications systems, and national security systems. As may be imagined, the failure of a power supply to deliver a predictable power can have serious and potentially dangerous consequences.

It is, therefore, common to provide standby electrical power supplies to provide redundant power to a primary power supply. Commonly, the primary power is supplied by a local utility company at, e.g., 240 volts AC or 120 volts AC at 60 Hertz.

Many types of standby power sources are available, including turbines, micro-turbines, battery powered inverters rotary engines, internal combustion engines, and more recently, high-speed electrical generators and flywheels have been developed. These standby power sources may vary from the primary power in terms of voltage, phase and frequency. Thus, the primary and standby power supplies may be unsynchronized, and if the primary and secondary supplies are applied to a load simultaneously, potentially harmful voltage spikes and current surges may occur.

To prevent interaction between primary and standby power sources some redundant power supplies have elaborate break before make switching to assure that alternating current sources of different voltages and frequencies do not get connected together.

In other applications where a load operates from direct current, some redundant power supplies connect the primary and standby supply inputs with diodes after each input has been full wave rectified. This type of configuration, however, does not eliminate the possibility of voltage multiplication if, for example, the primary and standby sources are operating from different grounds.

SUMMARY OF THE INVENTION

The present invention advantageously addresses the needs above as well as other needs by providing switching means on the rectified outputs of power supply inputs to isolate the inputs from mutual electrical interaction.

In one embodiment, the invention can be characterized as a power supply comprising: a rectified output, a first rectified power supply including a first rectified supply switch wherein the first rectified power supply is detachably coupled to the rectified output with the first rectified supply switch, a second rectified power supply including a second rectified supply switch wherein the second rectified power supply is detachably coupled to the rectified output with the second rectified supply switch, a first rectified power supply inhibitor electrically coupled with the second rectified power supply and communicatively coupled with the first rectified supply switch, and a second rectified power supply inhibitor electrically coupled with the first rectified power supply and communicatively coupled with the second rectified supply switch.

In another embodiment, the invention can be characterized as a method of providing switching between alternative power supplies comprising the steps of: sensing a first rectified voltage of a first rectified power supply, sensing a second rectified voltage of a second power supply, maintaining a second rectified power supply inhibit signal and maintaining a closed first rectified power supply switch in response to the first rectified voltage of the first rectified power supply being at least a predetermined voltage level, maintaining an open second rectified power supply switch in response to the second rectified power supply inhibit signal, opening the first rectified power supply switch, removing the second rectified power supply inhibit signal, closing the open second rectified power supply switch and providing a first rectified power supply inhibit signal in response to the first rectified voltage of the first rectified power supply being less than a second predetermined voltage level and the second rectified voltage of a second power supply being at least a second predetermined voltage level, and maintaining the opened first rectified power supply switch in response to the first rectified power supply inhibit signal.

In a further embodiment, the invention may be characterized as a power supply comprising: a first power supply with a first rectified voltage, a second power supply with a second rectified voltage, an ultimate rectified output, a second power supply inhibiting means for providing a second power supply inhibit signal in response to the first rectified voltage being at least a first predetermined voltage and removing the second power supply inhibit signal in response to the first rectified voltage being less than the first predetermined voltage, a first power supply inhibiting means for providing a first power supply inhibit signal in response to the second rectified voltage being at least a second predetermined voltage and the first rectified voltage being less than the first predetermined voltage, a first switching means for disconnecting the first rectified voltage from the ultimate rectified output in response to the first rectified voltage being less than the first predetermined voltage, a second switching means for providing the second rectified voltage to the ultimate rectified output when the second rectified voltage is at least the second predetermined voltage and the second power supply inhibit signal has been removed.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

The following description is not to be taken in a limiting sense, but is made merely for the purpose of describing the general principles of the invention. The scope of the invention should be determined with reference to the claims.

Figure 1:
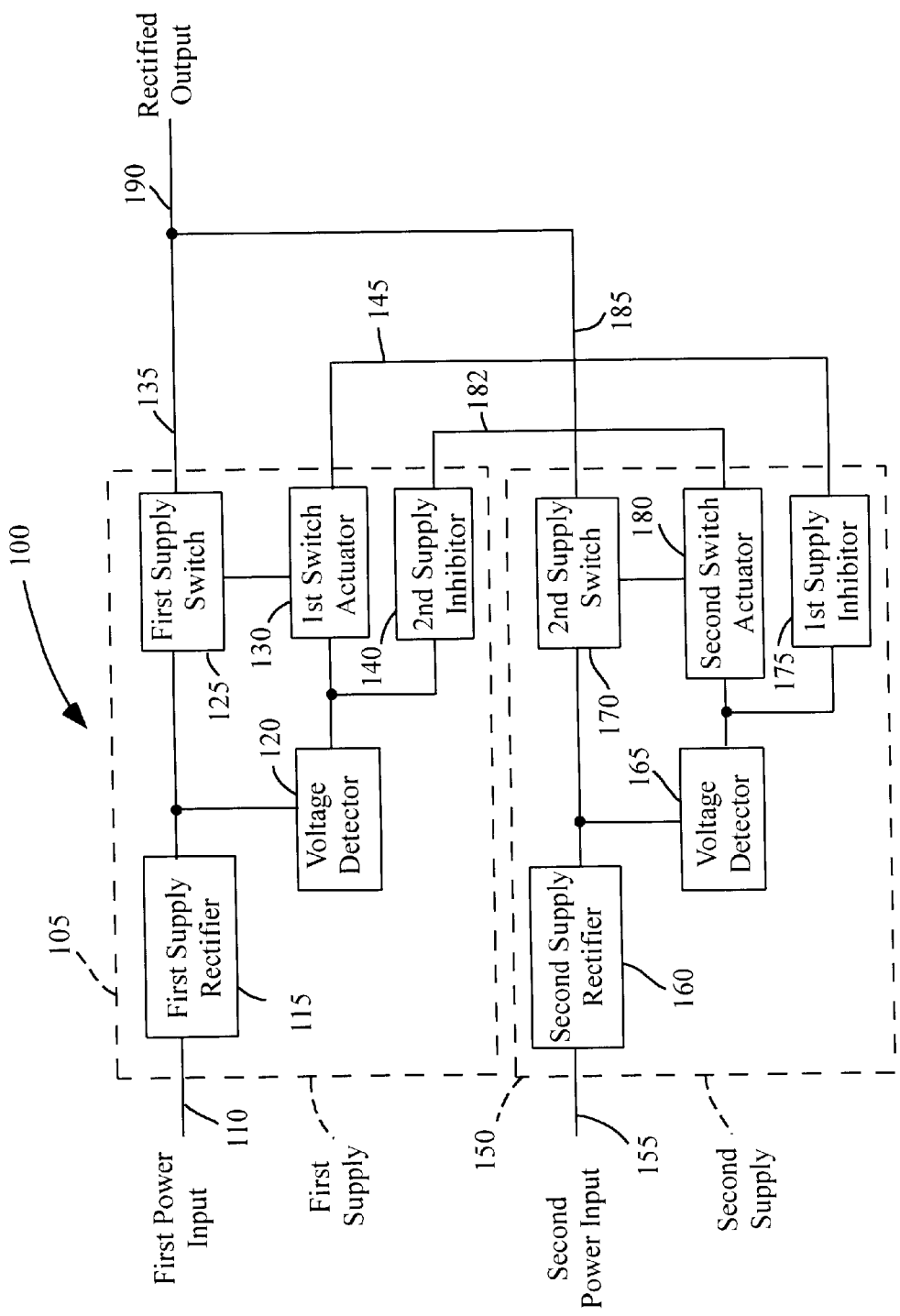
FIG. 1 is a functional block diagram depicting functional elements of a dual isolated inputs system for power supplies in accordance with one embodiment of the invention.

Referring first to FIG. 1, shown is a block diagram depicting functional elements of the dual isolated inputs system. Shown is a first power input 110, a first supply rectifier 115, a first supply voltage detector 120, a first supply switch 125 (also referred to as a first rectified power supply switch), a first supply switch actuator 130 (also referred to as first rectified power supply switch actuator), a first supply output line 135, a second supply inhibitor 140 (also referred to as a second rectified power supply inhibitor), a first supply inhibit line 145, a second power input 155, a second supply rectifier 160, a second supply voltage detector 165, a second supply switch 170 (also referred to as a second rectified power supply switch), a first supply inhibitor 175 (also referred to as a first rectified power supply inhibitor), a second supply switch actuator 180, a second supply output line 185, and a rectified output 190.

The first supply 105 (also referred to as a first rectified power supply) and the second supply 150 (also referred to as a second rectified power supply) each serve as an input to a power supply system wherein the rectified output 190 of the dual isolated inputs system 100 is an input to the power supply system. Thus, the first supply 105 and the second supply 150 collectively are dual inputs to the power supply system that are, as discussed herein, electrically isolated from one another.

As shown, a first supply 105 may include the first power input 110, the first supply rectifier 115, the first supply voltage detector 120, the first supply switch 125, the first supply switch actuator 130, the second supply inhibitor 140, and the first supply output line 135. Similarly, a second supply 150 may include the second power input 155, the second supply rectifier 160, the second supply voltage detector 165, the second supply switch actuator 180, the first supply inhibitor 175, and the second supply switch 170.

Functionally, the first supply 105 and the second supply 150 provide redundant sources of power to the rectified output 190 so that if one should fail the other is available to provide substantially uninterrupted power. Thus the first supply 105 may be known as a first rectified power supply and the second supply 150 may be known as a second rectified power supply. As discussed further herein and in reference to FIG. 3, the first supply 105, and the second supply 150, are electrically isolated and are switched so that only one of the first supply 105 and the second supply 150 are providing power to the rectified output 190 at any given time.

The first power input 110 and the second power input 155 may be either an alternating current ("A.C.") power source from, e.g., a local utility, a generator, and/or inverter or a direct current ("D.C.") power source such as batteries. Beneficially, the first power input 110 and the second power input 155 may be from power sources with different operating characteristics; as discussed further herein, the first power input 110 and the second power input 155 need not be synchronized, i.e., need not be in phase with on another, and may have different frequencies without adversely affecting the power at the rectified output 190. It should be noted that the first supply 105 need not have the first supply rectifier 115 if the first power input 110 is already a rectified voltage. Similarly, the second supply 150 need not have the second supply rectifier 160 if the second power input is already a rectified voltage.

Figure 2:
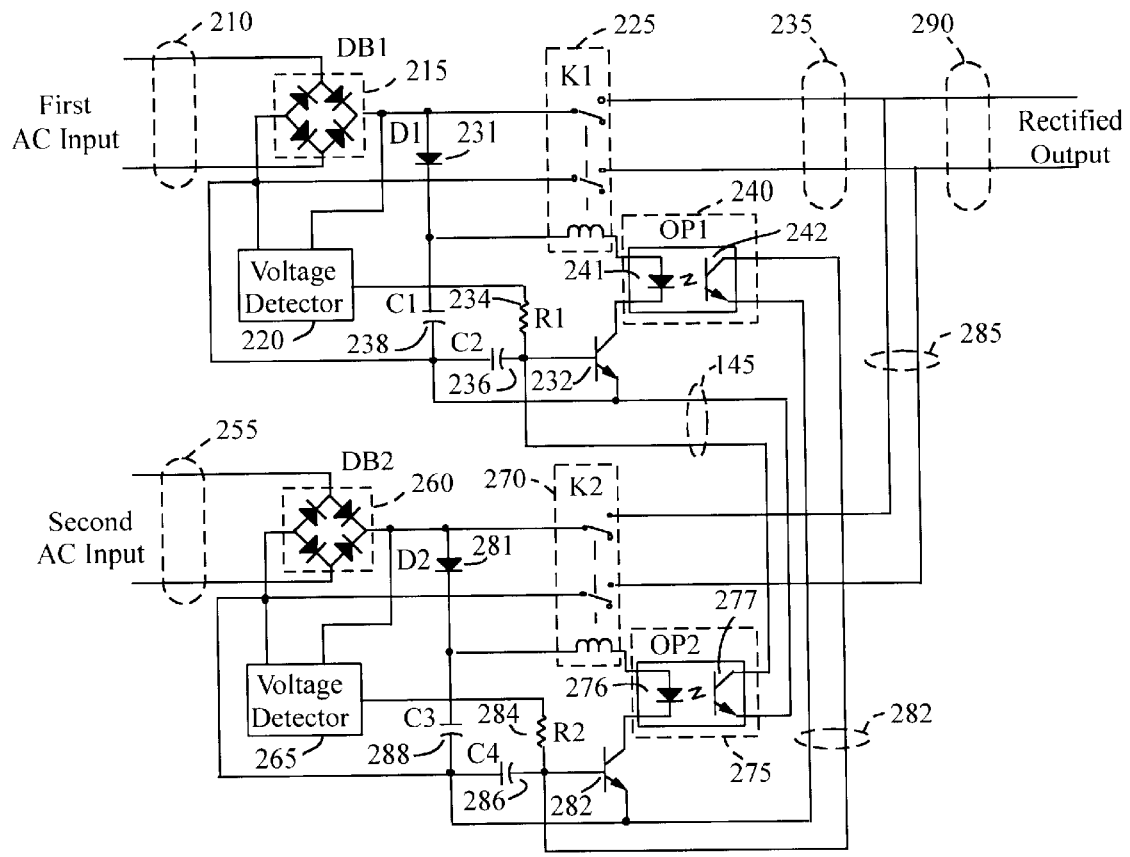
FIG. 2 is a schematic diagram of the hardware making up the embodiment of the dual isolated inputs system of FIG. 1.

Referring to FIGS. 1 and 2, the first power input 110, 210 and the second power input 155, 255 feed into the first supply rectifier 115 and the second supply rectifier 160 respectively. The first supply rectifier 115 and the second supply rectifier 160 operate to convert the voltage from the first power input 110 and the second power input 155 into a first rectified voltage and a second rectified voltage respectively. The first and second rectified voltages more closely resemble a direct current ("D.C.") voltage, i.e., a voltage that does not change polarity as does A.C. voltage. The first supply rectifier 115 and the second supply rectifier 160 may be a first full-wave bridge rectifier 215 and a second full-wave bridge rectifier 260 respectively which convert a typical A.C. sine-wave into the first and second rectified voltages that typically have "ripple", i.e., periodic variations in voltage about a steady value. The output 190, 290 is intended to drive power factor corrected power supplies that operate equally well from voltages of AC, rectified AC or DC.

The voltages at the outputs of the first supply rectifier 115 and the second supply rectifier 160, i.e., the first and second rectified voltages, are provided by electrical coupling to the first voltage detector 120, 220 and the second voltage detector 165, 265 respectively. The first voltage detector 120, 220 and the second voltage detector 165, 265 function to sense the voltage levels at the outputs of the first supply rectifier 115, 215 and the second supply rectifier 160, 260 respectively. As discussed further herein and in reference to FIG. 3, the first voltage detector 120, 220 and the second voltage detector 165, 265 provide, as an output, a first voltage confirmation signal and a second voltage confirmation signal respectively in response to the voltages at the outputs of the first supply rectifier 115, 215 and the second supply rectifier 160, 260 being within a predetermined voltage window. As is known in the art, the first voltage detector 120, 220 and the second voltage detector 165, 265 are tunable so that the predetermined voltage window may be adjusted to the requirements of the power supplies that are driven from the output 190, 290. This would typically be 90 to 265 volts AC referred to the inputs, 110 and 155.

The output of the first voltage detector 120 is electrically coupled to the first supply switch actuator 130 and the second supply inhibitor 140. The output of the second voltage detector 165 is electrically coupled to the second supply switch actuator 180 and the first supply inhibitor 175.

The first supply switch actuator 130 is electrically coupled via the first supply inhibit line 145 to the first supply inhibitor 175, and the second supply switch actuator 180 is electrically coupled via the second supply inhibit line 182 to the second supply inhibitor 140.

Figure 3:
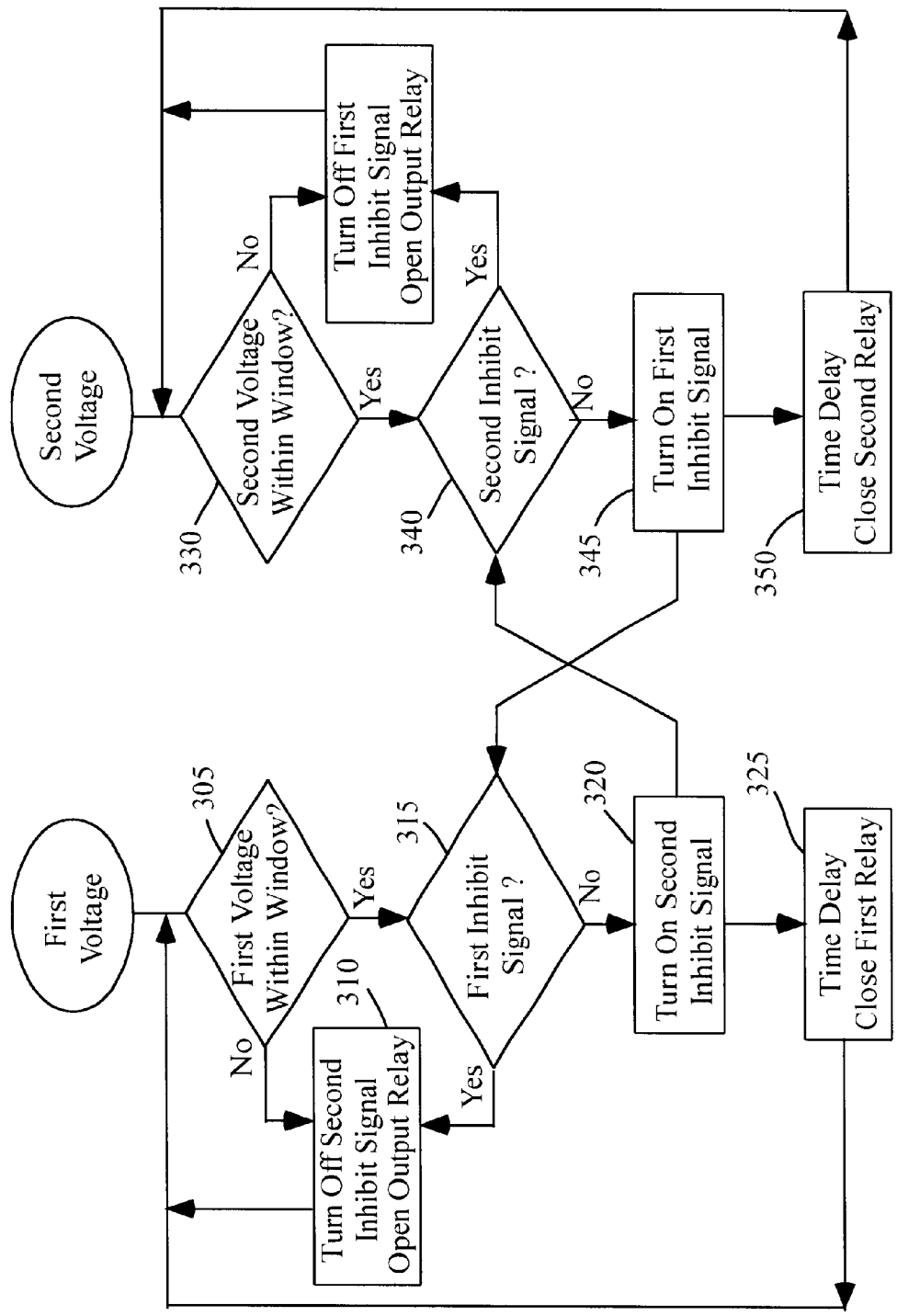
FIG. 3 is a flow chart describing the steps traversed by the dual isolated inputs system of FIGS. 1 and 2.

As discussed further herein and in reference to FIG. 3, the first voltage detector 120, first supply switch actuator 130 and the second supply inhibitor 140 function to provide the rectified output of the first supply rectifier 115 to the rectified output 190 while providing a second supply inhibit signal from the second supply inhibitor 140 to the second supply 150. The second supply inhibit signal from the second supply inhibitor 140 prevents the second supply 150 from providing power to the rectified output 190 when the rectified output of the first supply 105 is within the predetermined voltage window.

Similarly, as discussed further herein and in reference to FIG. 3, in the absence of the second supply inhibit signal from the second supply inhibitor 140, the second voltage detector 165, second supply switch actuator 180 and the first supply inhibitor 175 function to provide the rectified output of the second supply rectifier 160 to the rectified output 190 while providing a first supply inhibit signal from the first supply inhibitor 175 to the first supply switch actuator 130 to prevent the first supply 105 from providing power to the rectified output 190.

In practice, the first supply switch actuator 130, which may be referred to as a first rectified supply switch actuator, closes the first supply switch 125 when the second supply 150 is off line, i.e., is not providing power to the rectified output 190 and when the first rectified voltage is within the predetermined voltage window. In the present embodiment, the first supply switch actuator 130 provides power, in response to the first voltage confirmation signal from the first voltage detector 120 and an absence of the first supply inhibit signal from the first supply inhibitor 175, to close, the first supply switch 125 so that the first rectified voltage of the first supply rectifier 115 is provided directly to the rectified output 190 via the first supply output line 135.

Similarly, the second supply switch actuator 180, which may be referred to as a second rectified supply switch actuator, closes the second supply switch 170 when both the first supply 105 is off line, i.e., is not providing power to the rectified output 190, and the second rectified voltage is within the predetermined voltage window. As shown, the second supply switch actuator 180 provides the power, in response to the second voltage confirmation signal from the second voltage detector 165 and an absence of the second supply inhibit signal from the second supply inhibitor 140, to close the second supply switch 170 so that the second rectified voltage of the second supply rectifier 160 is provided directly to the rectified output 190 via the second supply output line 185.

As shown in FIG. 1 and FIG. 2, in one embodiment, the first supply switch 125, which may be referred to as a first rectified supply switch, and the second supply switch 170, which may be referred to as a second rectified supply switch, may be a first electromechanical switch 225 and a second electromechanical switch 270 respectively. The first electromechanical switch 225 and a second electromechanical switch 270 may be relay switches that are readily available and well known to one of ordinary skill in the art. In other embodiments, the first supply switch 125 and the second supply switch 170 may be solid state switches which are also readily available and well known to one of ordinary skill in the art.

The first supply switch actuator 130 may be a combination of circuit elements that include a first switching transistor 232, a first timing resistor 234 a first timing capacitor 236, a first diode 231, and a first power capacitor 238. Assuming the first supply 105 is a default supply, i.e., the first supply 105 receives power from the first power input 110 before the second supply 150 receives power from the second power input 155, the first voltage detector 220, in response to a first rectified voltage at the output of the first supply rectifier 215 being within a predetermined voltage window, drives the first switching transistor 232 through a time delay formed by the first timing resister 234 and the first timing capacitor 236; thus turning on the first switching transistor 232. The first diode 231 and the first power capacitor 238 form a DC power supply so that when the first switching transistor 232 is turned on, the DC power supply formed by the first diode 231 and the first power capacitor 238 drives a coil in the first electromechanical switch 225 which, in turn, closes the first electromechanical switch 225; thus the rectified voltage from the first full-wave bridge rectifier 215 is applied to the rectified output 290.

Similarly, the second supply switch actuator 180 may be a combination of circuit elements that include a second switching transistor 282, a second timing resistor 284 a second timing capacitor 286, a second diode 281, and a second power capacitor 288. As configured in FIG. 2, when the first electromechanical switch 225 is open, i.e., when the first supply 105 is no longer supplying power to the rectified output 190, the second voltage detector 265, in response to the second rectified voltage at the output of the second supply rectifier 260 being within the predetermined voltage window, turns on the second switching transistor 282 by driving the second switching transistor 282 through a time delay formed by the second timing resistor 284 and the second timing capacitor 286. The second diode 281 and the second power capacitor 288 form a second DC power supply so that when the second switching transistor 282 is turned on, the second DC power supply formed by the second diode 281 and the second power capacitor 288 drives a coil in the second electromechanical switch 270 which, in turn, closes the second electromechanical switch 270 and the second rectified voltage from the second full-wave bridge rectifier 215 is applied to the rectified output 290.

The second supply inhibitor 140, which may be referred to as a second rectified power supply inhibitor, functions to prevent the second supply 150 from applying a voltage to the rectified output 190 when the first supply 105 is providing a voltage within the predetermined voltage window. Similarly, the first supply inhibitor 175, which may be referred to as a first rectified power supply inhibitor, functions to prevent the first supply 105 from applying a voltage to the rectified output 190 when the second supply 150 is providing voltage to the rectified output 190.

As shown in FIG. 1, the second supply inhibitor 140 is electrically coupled to the second supply switch actuator 180. When the second supply inhibitor 140 receives the first voltage confirmation signal from the first voltage detector 120, indicating a voltage output from the first supply rectifier 115 is within the predetermined voltage window, the second supply inhibitor 140 provides the second supply inhibit signal to the second supply switch actuator 180 via the second supply inhibit line 182. The second supply switch actuator 180, in response to the second supply inhibit signal, will not activate, i.e., will not close, the second supply switch 170, even if the rectified voltage at the output of the second supply rectifier 160 is within the predetermined voltage window. In other words, the second supply switch actuator 180, when receiving the second supply inhibit signal, will not allow the voltage from the output of the second supply rectifier 160 through to the rectified output 190 even though the second supply switch actuator 180 is receiving a second voltage confirmation signal from the voltage detector 165.

In a similar fashion, when the first supply inhibitor 175 receives the second voltage confirmation signal from the second voltage detector 165, indicating the second rectified voltage from the second supply rectifier 160 is within the predetermined voltage window, the first supply inhibitor 175 provides the first supply inhibit signal to the first supply switch actuator 130 via the first supply inhibit line 145. The first supply switch actuator 130, in response to the first supply inhibit signal, will not activate, i.e., will not close, the first supply switch 125 even if the first rectified voltage at the output of the first supply rectifier 115 is within the predetermined voltage window. Therefore, the first supply switch 125 will not close while the second supply switch 170 is closed, and the second supply switch 170 will not close while the first supply switch 125 is closed. As a result, only one of the first supply 105 and second supply 150 is providing a voltage to the rectified output 190 at any given time, and potentially harmful effects of voltage from the first supply 105 being multiplied by voltage from the second supply 150 are mitigated.

As shown in FIG. 1 and FIG. 2, the second supply inhibitor 140 and the first supply inhibitor 175 may be a first opto-coupler 240 and a second opto-coupler 275 respectively. The first opto-coupler 240 and the second opto-coupler 275 are effectively high impedance insulators that communicatively couple the first supply 105 and the second supply 150, and yet, prevent electrical interaction, e.g. voltage multiplication or current flow, between the first supply 105 and the second supply 150. Thus, the first opto-coupler 240 allows the first supply 105 to control, e.g., inhibit, the second supply 150 while maintaining electrical isolation between the first supply 105 and the second supply 150. Similarly, the second opto-coupler 275 allows the second supply 150 to control, e.g., inhibit, the first supply 105 while maintaining electrical isolation between the first supply 105 and the second supply 150.

As shown, a first light emitting diode ("LED") emitter 241 of the first opto-coupler 240 is in series with the first coil of the first electromechanical switch 225, and a second LED emitter 276 of the second opto-coupler 275 is in series with a second coil of the second electromechanical switch 270. As a result, when the first voltage detector 220 is providing a first voltage confirmation signal which turns on the first switching transistor 232, the first electromechanical switch 225 is closed and the LED emitter 241 of the first opto-coupler 240 is illuminated; thus turning on a phototransistor 242 of the first opto-coupler 240. When the phototransistor 242 of the first opto-coupler 240 is turned on, the second switching transistor 282 is either maintained off or turned off; thus, preventing the second electromechanical switch 270 from closing.

Similarly, in the second supply, when the second voltage detector 265 is providing a second voltage confirmation signal that turns on the second switching transistor 282, the second electromechanical switch 270 is closed and a second LED emitter 276 of the second opto-coupler 275 is driven so that a second phototransistor 277 of the second opto-coupler 275 is turned on. When the second phototransistor 277 of the second opto-coupler 275 is turned on, the first switching transistor 232 is turned off; thus, preventing the first electromechanical switch 225 from closing.

Thus, a means of switching between two inputs to a power supply system, e.g., the first supply 105 and the second supply 115, is provided wherein the inputs are isolated so that the each input may be out of phase with one another, have a different potential and a different frequency without the adverse effects, e.g., potentially damaging voltage multiplication, present in diode isolated dual input power supply systems.

Referring next to FIG. 3, shown is a flow chart describing the steps traversed by the dual isolated inputs system of FIGS. 1 and 2 to provide switching between supplies 105 and 150.

Initially, either the first supply 105 or the second supply 150 will start first and lock out the other supply. Assuming that the first supply 105 starts up before the second supply 150, the first voltage detector 120 monitors the first rectified voltage at the output of the first supply rectifier 115 to determine if the first rectified voltage falls within the predetermined voltage window (Step 305).

If the first rectified voltage is within the predetermined voltage window, the first supply switch 125 is closed (Step 325), and the second supply inhibitor 140 prevents the second supply 150 from coming "on line", i.e., providing power to the rectified output 190, by inhibiting, as discussed above, the second supply switch actuator 180 from activating, i.e., from closing, the second supply switch 170 (Step 320).

If the first rectified voltage is outside the predetermined voltage window, the first voltage detector 120 does not provide a first voltage confirmation signal, and the first supply switch actuator 130 maintains the first supply switch 125 in an open position so that the first supply rectifier 115 is electrically disconnected from the rectified output 190 (Step 310). Additionally, the second supply inhibitor 140 remains inactive so that it does not inhibit the second supply switch actuator 180 from activating, i.e., closing, the second supply switch 170.

During the steps mentioned above, the second voltage detector 165 is continuously monitoring the output of the second supply rectifier 160, i.e., the second voltage detector 165 is continuously monitoring the second rectified voltage (Step 330).

If the second rectified voltage is outside the predetermined voltage window, the second voltage detector 165 will not provide the second voltage confirmation signal to the second supply switch actuator 180 so that the second supply switch actuator 180 continues to maintain the second supply switch 170 in a open position; thus isolating the second supply rectifier 160 from the rectified output 190 (Step 335). Additionally, the first supply inhibitor 175 remains inactive so that the first supply 105 is not inhibited; thus allowing the first supply 105 to come back on line (Step 325).

If the second rectified voltage is within the predetermined voltage window, the second voltage detector 165 provides a second voltage confirmation signal that activates the first supply inhibitor 175 so that the first supply inhibit signal prevents the first supply switch actuator 130 from closing the first supply switch 125; thus preventing the first supply 105 from coming back online—even if the first supply rectifier 115 once again provides a first rectified voltage within the predetermined voltage window (Step 345).

Additionally, the second supply switch actuator 180, in response to the second voltage confirmation signal from the second voltage detector 165, closes the second supply switch 170; thus providing the second rectified voltage from the output of the second supply rectifier 160 to the rectified output 190, i.e., placing the second supply 150 on line (Step 350).

As long as the second supply rectifier 160 continues to supply a second rectified voltage that is within the predetermined voltage level, the first supply inhibitor 175 continues to maintain the first supply inhibit signal so as to prevent the first supply 105 from coming on line regardless of the performance of the first supply 105 (Step 315). In other words, as long as the second supply 150 continues to provide a second rectified voltage that is within the predetermined voltage window, the first supply 105 is disabled.

If, however, the second rectified voltage from the second supply rectifier 160 deviates from the predetermined voltage window, and the first rectified voltage from the first supply 105 is detected by the first voltage detector 120 to be within the predetermined voltage window (Step 305), the first supply switch actuator 130 is activated; thus closing the first supply switch 125 which brings the first supply 105 on line (Step 325). Additionally, the second supply inhibitor 140 is activated; thus disabling the second supply 150 (Step 320).

It should be noted that either the first supply 105 or the second supply 150 may be the default supply, i.e., the power supply that provides power absent any failures within the supply.

While the invention herein disclosed has been described by means of specific embodiments and applications thereof, numerous modifications and variations could be made thereto by those skilled in the art without departing from the scope of the invention set forth in the claims.

What is claimed is:

1. A power supply comprising:
    a rectified output;
    a first rectified power supply including a first rectified power supply switch wherein the first rectified power supply switch detachably couples the first rectified power supply to the rectified output;
    a second rectified power supply including a second rectified power supply switch wherein the second rectified power supply switch detachably couples the second rectified power supply to the rectified output;
    a first rectified power supply inhibitor for communicatively coupling the second rectified power supply with the first rectified power supply; and
    a second rectified power supply inhibitor for communicatively coupling the first rectified power supply with the second rectified power supply.

2. The power supply of claim 1 wherein the first rectified power supply is isolated from the second rectified power supply.

3. The power supply of claim 1 wherein the first rectified power supply switch is an electromechanical switch.

4. The power supply of claim 1 wherein at least one of the first and second rectified power supply inhibitors includes an opto-coupler.

5. The power supply of claim 1 wherein the first rectified power supply further includes:
    a first voltage detector configured for receiving a first rectified voltage provided by a first supply rectifier and outputting a first voltage confirmation signal in response to the first rectified voltage being within a predetermined voltage window;
    a first rectified power supply switch actuator coupled with the first rectified voltage detector;
    wherein the first rectified supply switch actuator communicatively couples the first rectified power supply inhibitor with the first rectified power supply switch and the first rectified power supply switch actuator opens the first rectified supply switch in response to receiving both the first voltage confirmation signal and a first rectified power supply inhibit signal from the first rectified power supply inhibitor.

6. The power supply of claim 5 wherein the first rectified power supply switch actuator closes the first supply switch when, in the absence of the first supply inhibit signal, the first rectified supply switch actuator receives the first voltage confirmation signal.

7. The power supply of claim 1 wherein the first rectified power supply and the second rectified supply include full wave rectifiers.

8. A method of providing switching between alternative power supply inputs comprising the steps of:
    sensing a first rectified voltage of a first rectified power supply;
    sensing a second rectified voltage of a second rectified power supply;
    maintaining a second rectified power supply inhibit signal and maintaining a first rectified power supply switch in a closed state in response to the first rectified voltage of the first rectified power supply being at least a first predetermined voltage level;
    maintaining a second rectified power supply switch in an open state in response to the second rectified power supply inhibit signal;
    changing the first rectified power supply switch in a closed state to a first rectified power supply switch in an open state, removing the second rectified power supply inhibit signal, changing the second rectified power supply switch in an open state to a second rectified power supply switch in a closed state and providing a first rectified power supply inhibit signal in response to the first rectified voltage of the first rectified power supply being less than the first predetermined voltage level and the second rectified voltage of a second power supply being at least a second predetermined voltage level; and maintaining the first rectified power supply in the open state in response to the first rectified power supply inhibit signal.

9. The method of claim 8 wherein the first and second rectified power supply inhibit signals are transmitted via electric isolation devices.

10. The method of claim 9 wherein the electric isolation devices are opto-couplers.

11. The method of claim 8 further comprising the steps of:

providing a first full wave rectifier to generate the first rectified voltage of the first rectified power supply;

providing a second full wave rectifier to generate the second rectified voltage of the second rectified power supply.

12. A power supply comprising:

a first rectified power supply having a first rectified voltage;

a second rectified power supply having a second rectified voltage;

a rectified output;

a second rectified power supply inhibiting means for providing, in response to the first rectified voltage being at least a first predetermined voltage, a second power supply inhibit signal and for removing the second power supply inhibit signal in response to the first rectified voltage being less than the first predetermined voltage;

a first power supply inhibiting means for providing a first power supply inhibit signal in response to the second rectified voltage being at least a second predetermined voltage and the first rectified voltage being less than the first predetermined voltage;

a first switching means for decoupling the first rectified voltage from the rectified output in response to the first rectified voltage being less than the first predetermined voltage; and a second switching means for coupling the second rectified voltage to the rectified output when the second rectified voltage is at least the second predetermined voltage and the second power supply inhibit signal has been removed.

13. The power supply of claim 12 wherein the first switching means includes means for maintaining the first rectified voltage decoupled from the rectified output in response to both, the first power supply inhibit signal and the first rectified voltage being at least the first predetermined voltage.

14. The power supply of claim 12 wherein the first switching means includes means for, in the absence of the first power supply inhibit signal, coupling the first rectified voltage to the rectified output in response to the first rectified voltage being at least the first predetermined voltage.

15. The power supply of claim 12 wherein the first power supply inhibiting means and the second power supply inhibiting means include means for isolating the first power supply and the second power supply.

16. The power supply of claim 15 wherein the means for isolating the first power supply and the second power supply include opto-couplers.

17. The power supply of claim 12 wherein the first rectified power supply and the second rectified power supply include full wave rectifiers.

18. The power supply of claim 12 wherein the first switching means and the second switching means include electromechanical switching means.

19. The power supply of claim 12 wherein the first switching means and the second switching means include solid state switching means.

* * * * *

UNITED STATES PATENT AND TRADEMARK OFFICE
CERTIFICATE OF CORRECTION

PATENT NO.     : 6,614,671 B2                                              Page 1 of 1
DATED          : September 2, 2003
INVENTOR(S)    : Thrap It is certified that error appears in the above-identified patent and that said Letters Patent is hereby corrected as shown below:

<u>Title page,</u>
Item [73], Assignee, change "I-Bus / Phoenix, Incorporated" to
-- I-Bus Corporation --

Signed and Sealed this

Thirteenth Day of April, 2004

JON W. DUDAS
*Acting Director of the United States Patent and Trademark Office*